(12) United States Patent
Beck

(10) Patent No.: US 6,520,523 B2
(45) Date of Patent: Feb. 18, 2003

(54) REMOVABLE VEHICLE RUNNING BOARDS

(76) Inventor: Bradley L. Beck, 45814 Desert Springs Dr., Lancaster, CA (US) 93534

( * ) Notice: Subject to any disclaimer, the term of this patent is extended or adjusted under 35 U.S.C. 154(b) by 10 days.

(21) Appl. No.: 09/847,723

(22) Filed: May 2, 2001

(65) Prior Publication Data

US 2002/0163157 A1 Nov. 7, 2002

(51) Int. Cl.⁷ .................................................. B60R 3/00
(52) U.S. Cl. ......................... 280/164.1; 14/2.4; 108/44
(58) Field of Search .............................. 280/163, 164.1, 280/164.2, 165, 169, 154; D12/203; 14/2.4, 69.5; 296/35.3, 100.04; 108/42, 44, 152; 248/235

(56) References Cited

U.S. PATENT DOCUMENTS

| | | | |
|---|---|---|---|
| 1,568,303 A | * | 1/1926 | Webster ........................ 14/2.4 |
| 2,084,025 A | * | 6/1937 | Getz ........................ 280/164.1 |
| 3,989,148 A | | 11/1976 | Donohue |
| 4,003,483 A | | 1/1977 | Fulton |
| 4,042,992 A | | 8/1977 | Hyslop |
| 4,266,792 A | | 5/1981 | Sanders et al. |
| 4,311,320 A | | 1/1982 | Waters, Jr. |
| 4,385,565 A | * | 5/1983 | Roberts et al. ............. 108/152 |
| 4,451,063 A | | 5/1984 | Snyder |
| 4,838,567 A | | 6/1989 | Michanczyk |
| 4,934,721 A | | 6/1990 | Flores |
| 5,193,829 A | | 3/1993 | Holloway et al. |
| 5,269,036 A | | 12/1993 | Yan et al. |
| 5,286,049 A | | 2/1994 | Khan |
| 5,331,700 A | * | 7/1994 | Karcher et al. ................ 14/2.4 |
| 5,382,035 A | | 1/1995 | Waddington et al. |
| 5,511,750 A | | 4/1996 | Evenson |
| 5,601,300 A | | 2/1997 | Fink et al. |
| 5,603,134 A | * | 2/1997 | Whipkey et al. .............. 14/2.4 |
| 5,769,439 A | * | 6/1998 | Thompson .................. 280/163 |
| 5,895,064 A | | 4/1999 | Laubach |
| 5,938,397 A | * | 8/1999 | Schouest ..................... 414/537 |
| 6,076,844 A | * | 6/2000 | Stuart et al. ................. 280/163 |
| 6,158,798 A | | 12/2000 | Stedtfeld et al. |
| 6,185,775 B1 | | 2/2001 | McCarthy |
| 6,267,398 B1 | * | 7/2001 | Lombard ..................... 280/163 |

* cited by examiner

Primary Examiner—Brian L. Johnson
Assistant Examiner—Bryan Pischmann

(57) ABSTRACT

A removable running board for a vehicle that includes a quick-release mechanism for disengaging the running board from the vehicle, the disengaged running board adapted to serve as a loading ramp for loading the vehicle with cargo or a vehicle bridge for emergency crossing of a hazard.

2 Claims, 5 Drawing Sheets

REMOVABLE VEHICLE RUNNING BOARDS

BACKGROUND OF THE INVENTION

1. Field of the Invention

The field of the invention is directed generally to vehicle accessories, and in particular to removable vehicle running boards adapted to be used as a loading ramp and the like.

2. Description of Related Art

The use of running boards on vehicles such as vans, pickup trucks, and fur wheel drive vehicles is a well established practice. Running boards make it easier to enter and exit some vehicles, especially those with high clearance, as well as making roof access easier. Running boards can help protect the sides of the vehicle from road debris, and they are also used by some to enhance the aesthetic appearance of the vehicle's exterior. However, aside from the functions described above, the applicant is not aware of any additional uses for running boards in the prior art.

A loading ramp for vehicles is used to transfer cargo from one elevation to another from the ground to a truck flatbed. With certain cargo, due to weight constraints or other reasons, it is impractical to transport the cargo via vehicle without the use of a loading ramp. However, it is inconvenient to carry the loading ramp with the cargo as it diminishes the effective spatial and weight cargo capacity of the vehicle. Further, in the case of a pickup there may be no practical way to store the loading ramp to prevent then or mischief while the owner is away from the vehicle. There is a need in the art for a way to both store a loading ramp effectively and make use of the loading ramp in a secondary manner.

SUMMARY OF THE INVENTION

The invention comprises a board mountable on the side of a vehicle with a release mechanism for quick disengagement from the vehicle. The removable running board when mounted on the vehicle serves as both a stop to enter or exit the vehicle as well as a shield to protect the sides of the vehicles from road debris. When disengaged from the side of the vehicle, the removable running boards are adapted to be additionally used as loading ramps for boring cargo from the ground to the vehicle (especially a truck flatbed) and back. By serving a dual purpose, the present invention saves weight by eliminating the need to carry a separate loading ramp and provides the convenience of always having a loading ramp available.

BRIEF DESCRIPTION OF THE DRAWINGS

The exact nature of this invention, as well as its objects and advantages, will become readily apparent upon reference to the following detailed description when considered in conjunction with the accompanying drawing; in which like reference numerals designate like parts throughout the figures thereof, and wherein.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a quick release running board for a vehicle that duels as a loading ramp.

Figure 1:
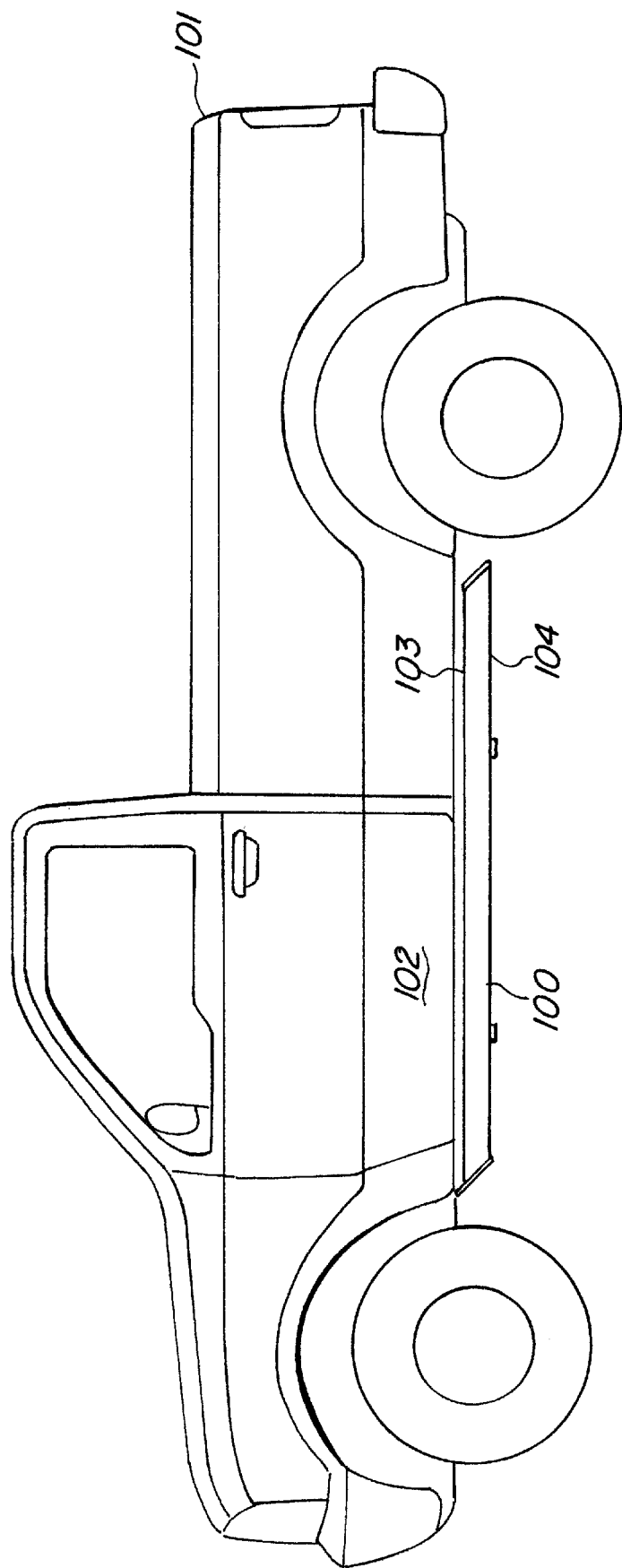
FIG. 1 is a side view of a preferred embodiment of the present invention in its capacity as a board.

The terms "running board" and "loading ramp" in this description refer to the planks which serve the particular purpose being discussed and are used interchangeably throughout. FIG. 1 illustrates a first preferred embodiment of the present invention. A pair of running boards 100 adorn each side of a vehicle 101 providing a utility step for ingress and egress from the vehicle. The running boards 100 also facilitate access to the top of a vehicle 101 and, if necessary, allow the operator of the vehicle a mode to access the rear of the vehicle without stepping on the ground below. Further, because the running boards 100 extend horizontally from the plane defined by the side of the vehicle, the running boards 100 shield the upper portion of the sides 102 of the vehicle from rocks, gravel, dirt, and other road debris while the vehicle 101 is in motion. In the preferred embodiment, the running board 100 has generally flat upper 103 and lower 104 surfaces and extends eight to twelve feet in length, although the invention is not limited to any particular length and other lengths are within the scope of the present invention. The generally flat upper surface 103 may include a slip-resistant surface (not shown) to prevent a user from slipping on the step should it become wet or cold. The slip resistant surface may be a thin sheet placed on top of the running board, such as an adhesive-back frictional surface, or may be a textured surface of the actual running board itself.

Figure 2:
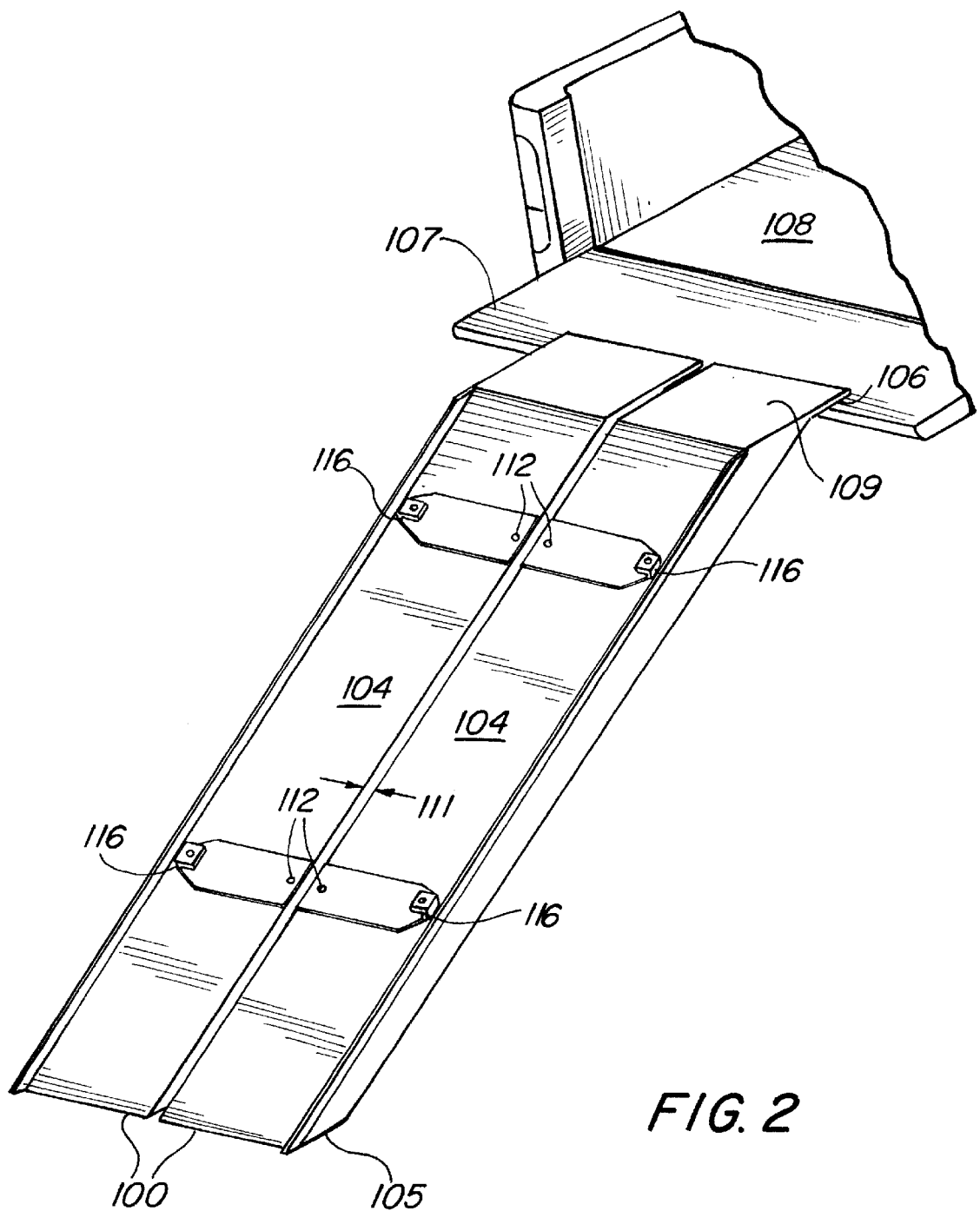
FIG. 2 is another view of a preferred embodiment of the present invention in its capacity as a loading ramp.
Figure 8:
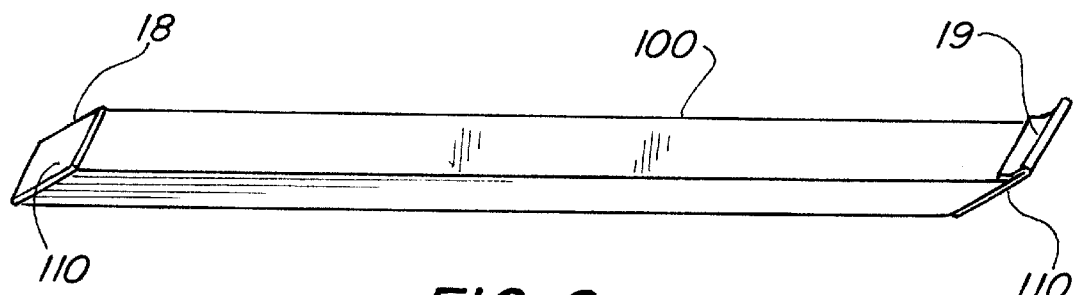
FIG. 8 is an illustration of the slip resistant surface on the loading ramp engaging surfaces.

FIG. 2 illustrates the running boards 100 depicted in FIG. 1 after the running boards 100 have been removed from the sides of the vehicle 101 using a quick release mechanism described more fully below. As shown in FIG. 2, the running boards 100 have been placed side-by-side with a first end 105 in contact with the ground and a second end 106 seated on the tailgate 107 of a truck bed 108. In this configuration, the running boards 100 form a sturdy loading ramp for transferring cargo to the truck bed 108. As can be appreciated in FIG. 2, the ends 105,106 of the running board/loading ramp 100 are formed so as to lie with a portion of the running board 100 flush against the ground while the opposite end of the running board 100 forms a horizontal transition portion 109 from the incline region to the truck bed. Contact surfaces 110 on the loading ramps that engage the ground and the truck tailgate preferably include a slip resistant surface to prevent the loading ramp from sliding while in use (see FIG. 8). The slip resistant surface 110 can be added to the surface of the loading ramp contact surface or be a textured pattern imparted directly on the surface itself.

The angular dimensions of the first end portion 105 contact surface transition from the ground to the loading ramp and the second end portion 106 from the incline to the truck bed 108 can be established by using the height of the truck bed and the length of the loading ramp 100. In this manner the contact surfaces can be made to lie flat on the respective mating surface and, accordingly, the loading ramps 100 provide a smooth transition from the ground level to the truck bed level.

Figure 3:
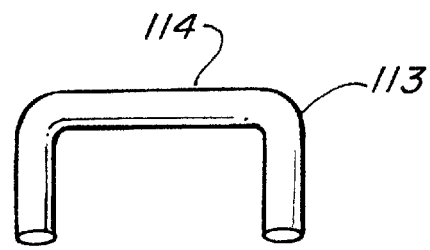
FIG. 3 is an elevated perspective view of a pin used to secure the loading ramps together.

The two running boards 100 when placed in the configuration of FIG. 2 provide a ramp for moving cargo into and out of the truck bed 108. The running boards 100 when laid side by side may allow for a gap 111 between the two ramps 100. The gap 111 is small and does not affect the performance of the ramps 111, and can increase the overall effective width of the ramp. To secure the ramps 100 and prevent the ramps from moving laterally or separating while in use, a first and second pairs of holes 112 aligned at the innermost edges of the two loading ramps 100 are used in connection with two "U"-shaped pins 113 (see FIG. 3) that are inserted into the holes 112 to stabilize the loading ramps 100. The pins 113 are inserted into the holes 112 and held by gravity to prevent the ramps 100 from spreading apart. Further, a tether (not shown) from the vehicle trailer hitch (not shown), for example, to the crossbar 114 of the "U"-shaped pin 113 can secure the pin and further ensure that the ramps do not move or tip while in use. The "U"-shaped pin 113 acts as an anchor for the tether to provide a location for a tension force on the ramps to stabilize the assembly.

The upper surface 103 of the loading ramps 100, which in the preferred embodiment are the lower surface of the running boards, may include a slip resistant surface for additional security against inclement conditions or particularly heavy cargos. As further shown in FIG. 2, each loading ramp 100 preferably includes a pair of mounting brackets 116 used to secure the loading ramps 100 to the vehicle sides in their role as running boards as described more fully below.

Figure 4:
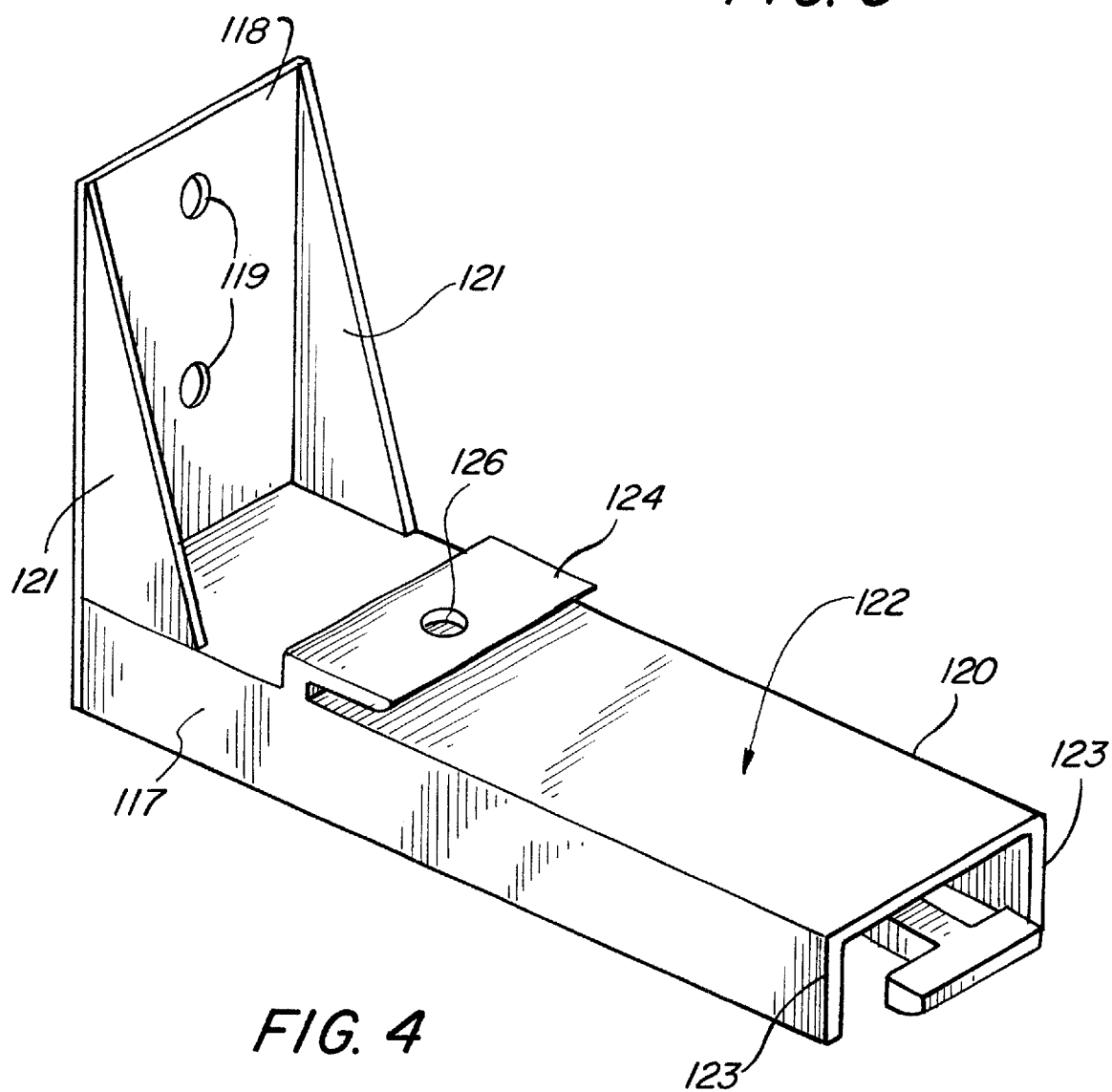
FIG. 4 is an elevated perspective view of a mounting bracket for the running boards.
Figure 5:
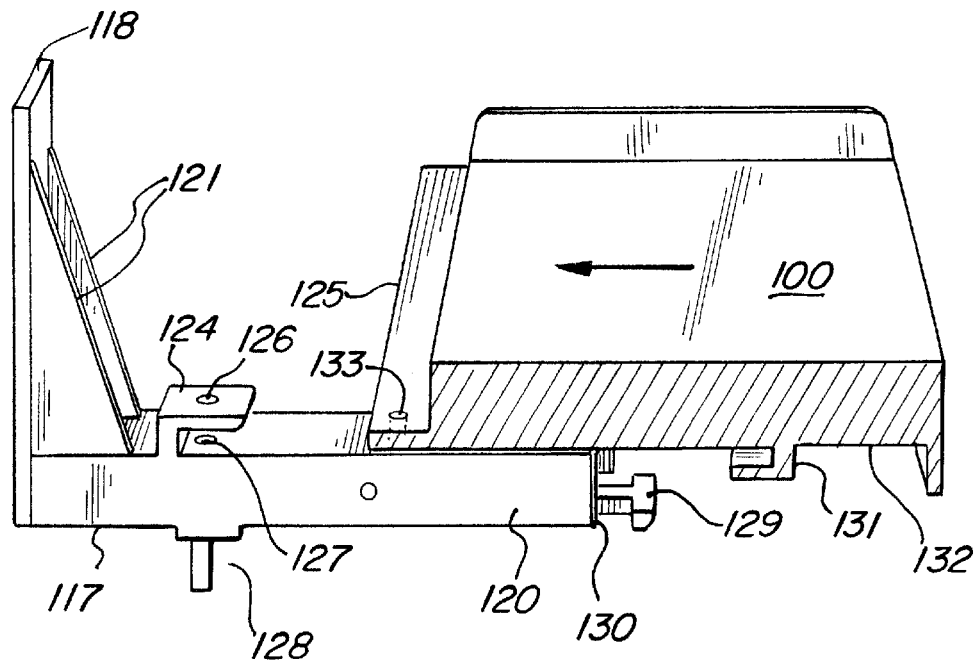
FIG. 5 is an elevated side view, partially cut away, of the engagement between the mounting bracket and the running board.
Figure 6:
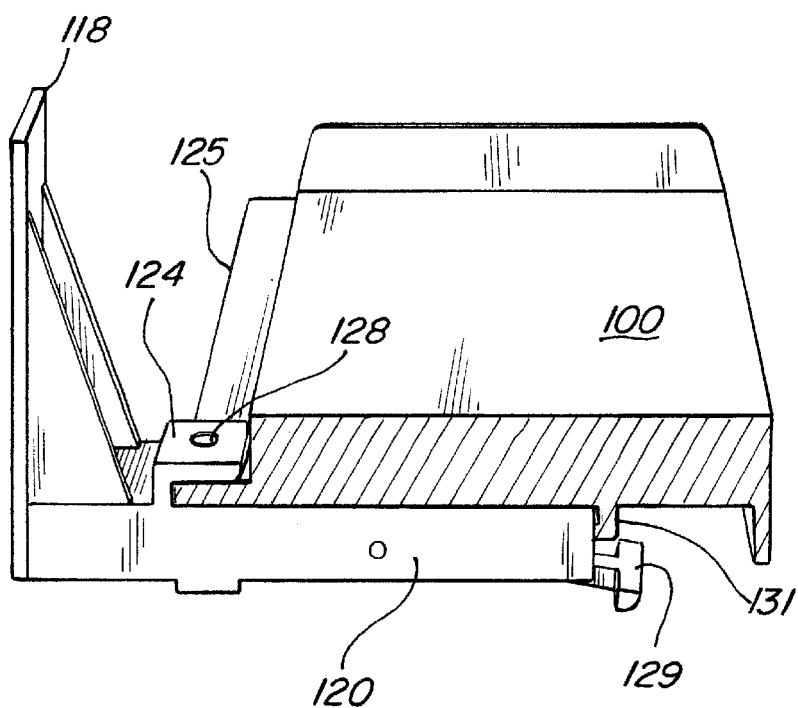
FIG. 6 is an elevated side view, partially cut away, of the engagement between the mounting bracket and the running board in the locked position.

Turning to FIGS. 4–6, the quick release mechanism for holding the running boards 100 to the vehicle 101 will be described in greater detail. The feature includes a mounting bracket 117 illustrated in FIG. 4 that may be mounted to the frame of the vehicle 101. The bracket 117 comprises a mounting plate 118 with holes 119 sized to accommodate fasteners (not shown) that rigidly secure the bracket 117 to the vehicle frame, and a running board support 120 member to hold the running board. A pair of reinforcing plates 121 may be preferably used to join the mounting plate 118 with the running board support member 120 to provide additional load capability needed when the running board 100 carries a load. The running board support member 120 preferably includes an upper surface 122 and opposed side walls 123 formed of a unitary construction to provide sufficient load bearing capacity for the running boards 100 plus the weight of a person using the running board as a step.

The running board support member 120 projects horizontally from the mounting plate 118 to just behind the plane defined by the side of the vehicle. The running board support member 120 preferably includes on its upper surface 122 a catch 124 for receiving the tab 125 at the leading edge of the running board 100, as can be seen more easily in FIGS. 5 and 6. The aperture 126 in the catch 124 and the aperture 127 in the running board support member 120 are aligned and sized to receive a locking pin 128 therein. The locking pin 128 can be triggered by raising and lowering the lever 129 located at the distal end 130 of the running board support member 120 opposite the mounting plate 118. The lever 129 operates a spring mechanism (not shown) that causes the locking pin 128 to retract and protrude through the two apertures 126, 127.

FIGS. 5 and 6 illustrate a preferred manner of releasebly locking the running boards 100 to the vehicle 101 using the mounting bracket 117 just described. With at least a pair of mounting brackets 117 on each side of the vehicle 101 and bolted or otherwise secured to the underside of the vehicle, the running board 100 may be set on the running board support members 120 to support the weight of the running board 100. As the running board 100 is brought in proximity with the catch 124 on the support member 120, the tab 125 running generally the length of the running board 100 engages the catch 124 and stops the progress of the running board 100. The catch 124 and tab 125 serve to stabilize and secure the running board 100 on its support member 120 as shown in FIG. 6. A second catch 131 on the underside 132 of the running board 100 is preferably located and oriented such that, when the tab 125 engages the first catch 124 on the support member 120, the second catch 131 engages the support member 120 from below further securing the two elements. A hole 133 on the tab 125 of the running board 100 is sized to receive the locking pin 128 of the mounting bracket 117 such that, when the hole 133 on the running board 100 is aligned with the apertures 126,127 on the mounting bracket 117 and the lever 129 is operated to engage the locking pin 128, the locking pin 128 passes through the hole 133 on the running board 100 and locks the running board 100 onto the support member 120 (see FIG. 6). In a like manner, the running board 100 can be disengaged quickly from the mounting brackets 117 by first retracting the locking pin 128 via the lever 129, and then withdrawing the running board 100 from the catch 124.

In addition to the above described quick release locking mechanism, other methods of securing the running board 100 to the vehicle 101 may be used without deviating from the present invention. For example, a solenoid may replace the mechanical operation of the lever such that the locking pin 128 operation is handled electronically. This feature allows for additional security measures such as the necessity of a security code to release the running boards, although security measures for controlling the mechanical embodiment is anticipated and within the scope of the present invention.

The construction of the running boards/loading ramps 100 are preferably achieved by a single piece extrusion process with the ends 18,19 capped to make the running boards air-tight. The material should be chosen to afford sufficient strength for the desired loading requirements while mindful of the ever present goal of weight reduction in a vehicle 101. In a preferred embodiment, the running boards 100 are made of a steel alloy and, where the ends 18,19 of the running boards have been capped to create an airtight interior or the material floats, the running boards may also be used as emergency floatation devices in an emergency. Additionally, the running boards 100 once removed from the vehicle 101 can be used as a bridge to allow the vehicle to cross a small tributary, hole, or other impediment.

Figure 7:
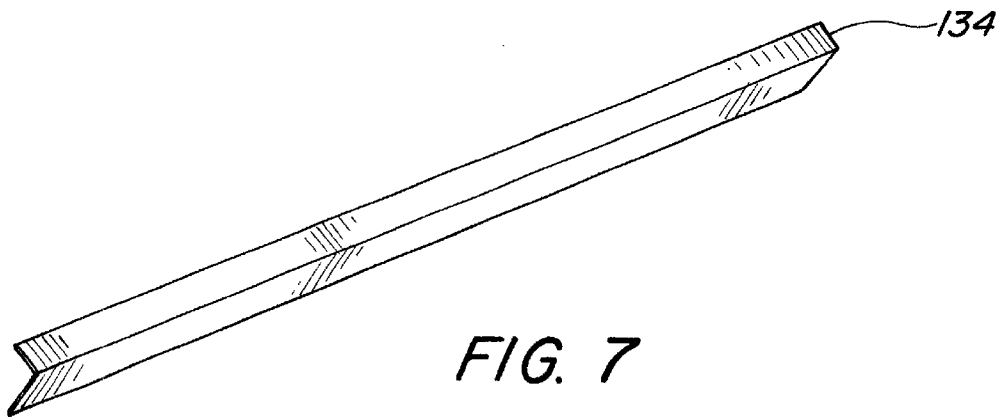
FIG. 7 is a perspective view of protective covering for the running board.

As with the style with most current running boards, most of the running board will typically be hidden from view (behind the plane defined by the side of the vehicle) with only a portion of the running board in view. To vary the appearance of the running boards and make the running boards more aesthetically pleasing, a cover 134 (see FIG. 7) may be employed over the exposed portion of the running board 100. The cover 134 can protect the running board 100 and provide a more stylish look to the running boards.

Figure 9:
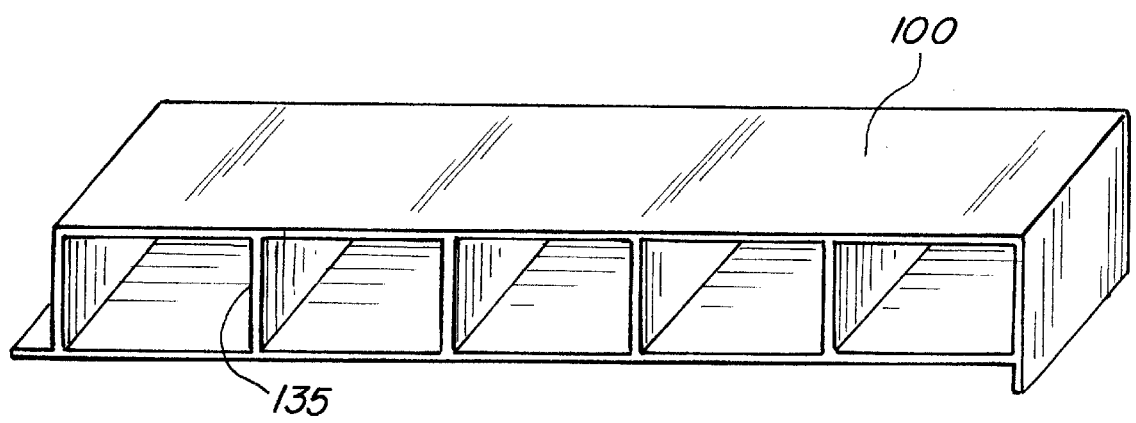
FIG. 9 is an elevated perspective view of a cross-section of a preferred embodiment.

The present invention may be altered in dimension and strength according to its anticipated use. For example, a mini-pickup truck with a short truck bed is typically lower to the ground than larger trucks. Its cargo may be of a smaller weight such as a lawnmower or mini-bike. A suitable ramp (and running board) could be a narrower, lightweight ramp with little or no support braces. Alternatively, a large four-wheel drive pickup truck with significantly more load capacity may be hauling a large all terrain vehicle or jet skis, requiring a wide ramp with heavy load capability. In this case, the ramp 100 will typically include a plurality of internal brace elements 135 (see FIG. 9) for greater structural integrity.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A system for releasably securing a running board to a vehicle comprising:

a mounting bracket rigidly secured to the vehicle having a plate affixed to the vehicle and a running board support member horizontally projecting therefrom, said support member including a catch on an upper surface for capturing a portion of the running board, and a releasable pin passing through the support member and the running board; and a running board having a first portion adapted to cooperate with the catch on the support member to position the running board thereon, and a hole on the first portion for accommodating the releasable pin.

2. A multipurpose running board comprising:

a single step release mechanism for rapidly disengaging the running board from a vehicle mount;

a first end including a first angled surface for maintaining substantial contact with a first horizontal surface while said running board is inclined from said first horizontal surface, and a second end including a second angled surface for maintaining substantial contact with a second horizontal surface while said running board is inclined from said first horizontal surface; and an airtight compartment within the running board to allow the running board to float.

* * * * *